March 20, 1951     H. E. LONNGREN     2,545,666
PIPE INTERSECTION BEVEL CUTTING DEVICE
Filed May 9, 1950
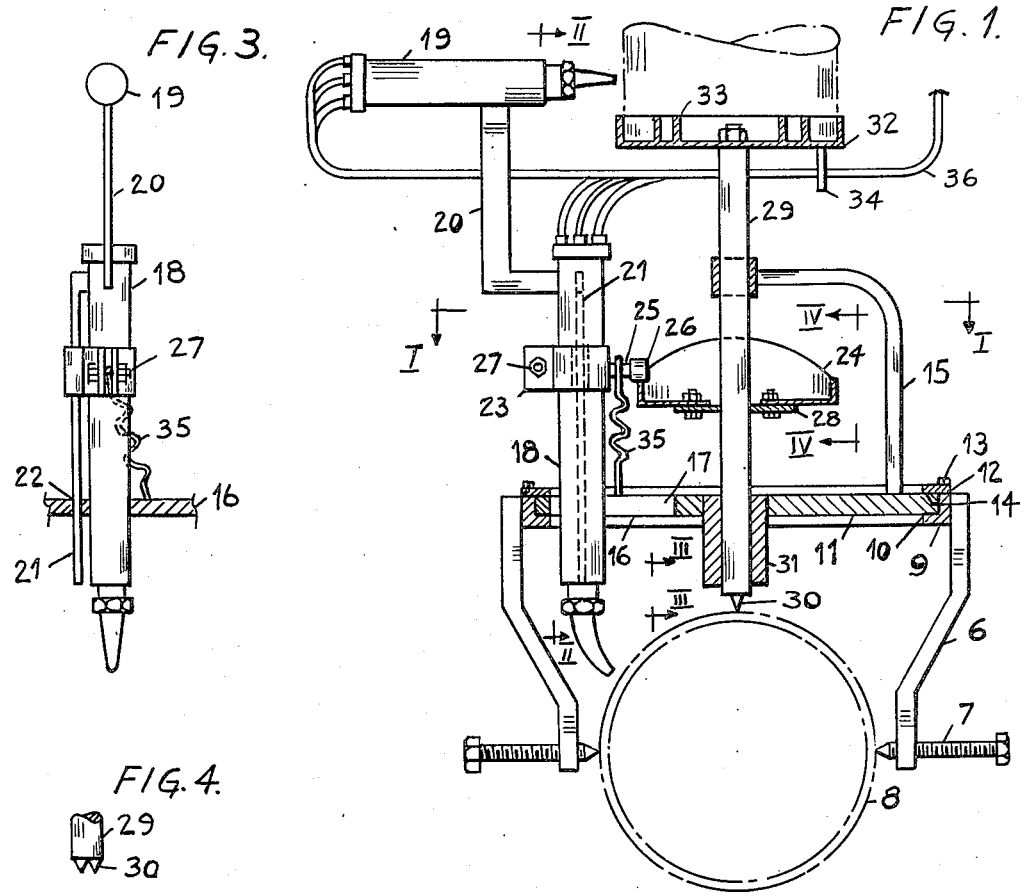
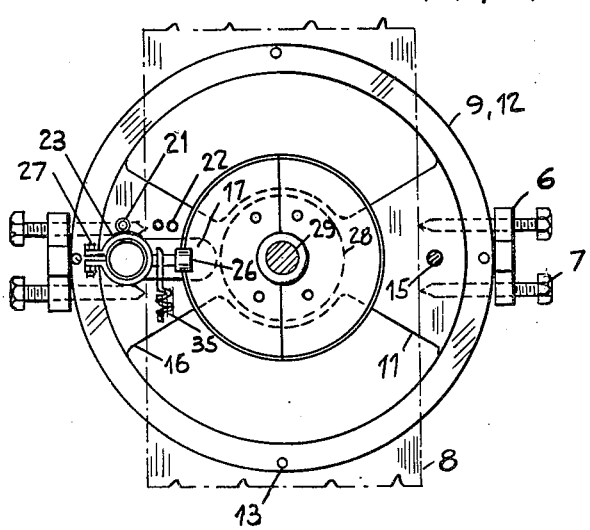
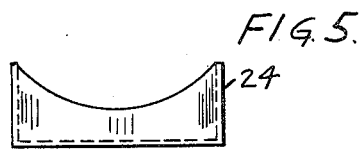
Harald E. Lonngren
INVENTOR.

Patented Mar. 20, 1951

2,545,666

UNITED STATES PATENT OFFICE 2,545,666

PIPE INTERSECTION BEVEL CUTTING DEVICE

Harald E. Lonngren, New York, N. Y.

Application May 9, 1950, Serial No. 160,932

1 Claim. (Cl. 266—23)

The present invention relates to pipe intersection flame bevelling devices and has particular reference to a portable bevelling device suitable for flame cutting of welding bevels simultaneously in a pipe wall and in the therewith connected pipe branch.

Flame cutting is an old art presently used quite extensively to bevel pipe ends for fusion welding purposes. While pipe ends for simple butt-joints can readily be flame cut and bevelled in a machine or device, manual flame bevelling is still preferred when one pipe is to be joined to another to form a T, in view of the fact that available machines for such cases are rather complicated and costly. Moreover, such machines must be accurately mounted on a frame and it is necessary to transport the pipes to the machine for bevelling purposes. A specially trained operator is required. The pipe must also be in perfect horizontal position in the machine for bevelling a wall opening and it must be rotated therein for end cutting. Independent set-ups for the two operations is required.

Generally a flame bevelling device is to be considered as a mechanization of the old flame cutter or torch, that is, as a device constituting only a frame or mounting for mechanically operating the cutter so as to attain desirable results. Thus it is a requisite equipment feature of such devices to cause the flame cutter to travel in a fully determined path in order to attain properly shaped bevels. In prior art devices, two independently operated flame cutters are employed, one of which cuts the pipe ends and the other of which burns the opening in the pipe wall. An assembly for the latter operation involves an electric motor, adjustable cams and levers, all requiring special operational skill to insure accurate results. For the pipe end cutting operation again, it is a necessary feature of prior art devices that the pipe itself be rotated therein, first in one direction and then in the opposite direction. For this reason the prior art devices are necessarily large and cumbersome to operate. Also, these devices were designed to be used with the pipes perfectly mounted and aligned in them and they are not well adapted to the purpose especially suited by the device of the present invention, namely, flame cutting simultaneously of both the wall opening and the pipe branch end of a T-connection when the device itself is attached to the straight-run pipe for cutting purposes. The device of the present invention is a departure from such type of devices in the use of exact cutting templates so arranged to permit two intertied flame cutters to travel simultaneously in precise paths to effect flame bevelling of a complete T-connection in one operation without resetting regardless of disposition or true level of the straight-run pipe.

It is a primary object of my invention to provide a portable mounting for a flame cutter comprising a manually operated device for flame cutting bevels in pipes for intersection welding purposes, by means of which said bevelling operation is performed regardless of the actual whereabout of the pipe, that is, whether the pipe is in a work shop, at the site of erection or even installed in place in a system, the portable feature being such that the device is attachable to the pipe itself for proper functioning.

It is a second object of my invention to provide a portable flame cutter mounting suitable for holding two flame cutters, one above the other, hereinafter fully explained, by means of which arrangement it is possible to simultaneously cut the required welding bevels in the straight-run pipe wall and in the thereto fitted branch pipe end.

It is a further object of my invention to provide a portable mounting for two intertied flame cutters comprising a manually operated device, attachable to the pipe wall and suitable for flame cutting simultaneously welding bevels in pipes to form T-connections of varying sizes, say, for a group comprising three inch, four inch and six inch branches in four inch, six inch and eight inch straight-runs, and the like combinations of pipe sizes.

It is a specific object or objects of my invention to make available a portable flame bevelling device so constructed as to be easily attached to a pipe in any desired position circumferentially and readily operated manually while so attached with a high degree of accuracy and with any desirable cutting speed commensurate with the metal thickness without further adjustments once the proper template selection has been made.

Other and further objects will hereinafter appear from the ensuing description and claim.

As already stated, I am aware that prior to my invention bevelling machines have been made with mechanically operated flame cutter housings. However, insofar as I know, there is no prior disclosure, nor does any prior research anticipate the real substance of my present invention, which, as stated, relates primarily to a portable, double acting bevelling device by means of which it is possible to secure the results indicated hereinbefore. One of the outstanding advantages of flame cutting intersection welding bevels in pipes with a device of my invention over the use of any prior device with which I am familiar, resides in the possibility of producing a complete bevelling job for a T-branch pipe connection with only one operation and set-up, which is executed with the straight-run pipe not necessarily in a horizontal position. This represents an important advance in the art because such a bevelling job will not suffer from inaccuracies of independent and separate set-ups presently employed, but rather, for all practical purposes, will produce welding bevels in pipes which mate with a high degree of accuracy. This accuracy is primarily due to the fact that exact templates are employed by means of which set-up errors are obviated. It is pointed out that an important feature of my invention resides in the tying together of the two required flame cutters whereby the imparted travel of each cutter can not vary from a preset course.

The device of the present invention depends for its essential activity upon the travel of the flame cutter assembly in a predetermined path as dictated by the shape of a particular template element. These elements consist of stub ends which have been accurately pre-shaped to the exact contour of the intersection between the pipes. A unit piece is mounted in a plane perpendicular to the axis of the straight-run pipe at the center of the device.

My invention is fully disclosed in the present specification and claim, reference being had to the accompanying drawing.

In the accompanying drawing Figure 1 illustrates the general form of a particular embodiment. Figure 2 is a plan view taken along line I—I of Figure 1. Figure 3 presents a view taken along line II—II of Figure 1. Figure 4 and Figure 5 are partial elevational views taken along lines III—III and IV—IV of Figure 1, respectively.

The device in general consists, in its simplest embodiment, of a clamp having a generally ring-link spine adapted to be secured to a pipe with set screws. The spine portion is adapted to receive and hold in a rotatable manner a handwheel, which is provided with two or more spokes, in one of which there is a slotted opening to accommodate a flame cutter body and a number of small round holes through which a rod passes for proper positioning of the flame cutter. In order to provide a positive predetermined travel path for the flame cutter, as it is rotated by means of the handwheel, a properly shaped template is mounted centrally above the handwheel upon a vertical shaft which remains stationary while the handwheel is turned. The flame cutter body is adjustably positioned in the vertical direction and retained after adjustment by a clamp which also holds a roller or small wheel which in turn rests upon and follows the contour of a particular template. Thus the flame cutter is caused to prescribe a path which corresponds to the intersection between the pipes. All these features and others will more clearly and at large appear from the following detailed description.

In Figure 1, the device is shown as involving a clamp 6 with screws 7 for anchorage to a pipe 8. The clamp spine 9 is circular in shape and is provided with a continuous shoulder 10 adapted to retain in bearing contact therewith a rotatable handwheel 11. A retainer ring 12 with screws 13 is secured to the spine so as to form on the same a collar 14 to guide the handwheel in co-operation with said shoulder 10 in a well-known manner. The handwheel, rotated by a handle 15, has one of its spokes 16 adapted to adjustably accommodate a flame cutter assembly in a slot 17, said assembly comprising two ordinary flame cutters 18 and 19 tied together with a bar 20, one cutter above the other, as shown. A rod 21 prevents the cutter assembly from rotating around its own axis as said rod passes through a hole 22 in the spoke 16. The cutter assembly is vertically adjustable and retained after adjustment by a set clamp 23 which in turn rests upon a centrally mounted template 24 with a stubshaft 25 and a roller or small wheel 26. Proper clamp-grip around the body of cutter 18 is furnished with setscrew 27.

The template 24, previously referred to, and shown also in Figure 5, comprises a rolled-up plate, the upper edge of which has been pre-shaped to the exact contour of the intersection between two pipes; in the illustrated case corresponding to the intersection between a six inch branch pipe and an eight inch straight-run. A required template set is preferably made up of unit elements split in two halves and bolted to a collar 28 fastened to a vertical shaft 29 which rests upon the pipe 8. The lower end of said shaft is provided with two pegs 30 which fit into customary center punches in the pipe wall. Rotation of said shaft is thus impossible. The shaft 29 passes through and is guided by a hub 31 in the handwheel. The upper end of said shaft is guided by the handle 15. To said shaft is attached a round centering plate 32 having collars 33 which match the outside diameter of each branch pipe and thus serve as centering aids in a well-known manner. A bracket 34 supports the leads 36 to the flame cutters. A helical extension spring 35 is attached to the spoke 16 and the stub shaft 25 so as to insure rolling contact between wheel 26 and the template element 24.

It will thus be readily perceived that the objects of the present invention are all fully attained with the described device, which in reality is particularly advantageous for work in the field. In the case of straight-run pipes with large bent portions no handicap presents itself inasmuch as the device is readily mountable on such pipes without the need of swinging such pipes into a particular position. The device designed according to the invention is particularly suitable for pipe intersection bevelling because of the relatively simple and light weight structure of the device and the easily available means for attaching it to a pipe. Moreover, owing to the true template path, the method of bevelling and cutting pipes for intersection welding is not only highly satisfactory but passes the rigid requirements of power piping codes, and yet it is so simple to operate that a specially trained operator is not required. Any man familiar with torch cutting in general can operate the device properly.

Other embodiments of the invention are believed evident to those familiar with the art to which the device of this invention relates.

What I claim is:

A portable manually operated pipe intersection bevel cutting device, comprising a clamp having a ring body, including a cylindrical shoulder in said body, a hand wheel, concentric with said shoulder, freely disposed in sliding contact with the walls of said shoulder, a retainer ring, secured to the clamp body and in position on the shoulder to axially retain said hand wheel, a handle on said hand wheel, said hand wheel having a tubular hub disposed centrally therein, a central shaft thru said hub and guided thereby, said shaft being provided with two axial pegs at one end and a centering plate having circular ridges corresponding to the outside diameter of the pipes at the other end, a pre-shaped template having the contour of the intersection between the pipes, a collar fixed on said shaft, to which collar said template is anchored concentrically of the shaft, an elongated torch positioned with the body thereof extending thru and slidable in an opening in said hand wheel to revolve therewith, and with the longitudinal axis of the body of said torch extending parallel to the central shaft, a clamp frictionally secured to the body of said torch, a stubshaft secured to said clamp, a roller on said stubshaft in engagement with said template, a helical extension spring attached at one end to said stubshaft with the other end secured to the hand wheel to bias said stubstaft and clamp toward the handwheel, a second elongated torch secured to and at right angles to said first mentioned torch with the elongated bodies and the tips of both torches in the same vertical plane, a rod fixed at one end to and parallel to the body of the first mentioned torch and slidably extending thru a second opening in the hand wheel for preventing a rotation of said torch around its own axis and restraining the first mentioned torch to reciprocal movement along its axis parallel to the central shaft and said clamp constituting means for securing the device to a pipe.

HARALD E. LONNGREN.

REFERENCES CITED

The following references are of record in the file of this patent:

UNITED STATES PATENTS

| Number | Name | Date |
| --- | --- | --- |
| 1,858,077 | Douglass et al. | May 10, 1932 |